US011315111B2

(12) United States Patent
Ma

(10) Patent No.: US 11,315,111 B2
(45) Date of Patent: Apr. 26, 2022

(54) METHODS AND DEVICES FOR TESTING SIGNATURE VERIFICATION FOR BLOCKCHAIN SYSTEM

(71) Applicant: Advanced New Technologies Co., Ltd., Grand Cayman (KY)

(72) Inventor: Yu Ma, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/721,346

(22) Filed: Dec. 19, 2019

(65) Prior Publication Data

US 2020/0286087 A1 Sep. 10, 2020

Related U.S. Application Data

(63) Continuation of application No. PCT/CN2019/076884, filed on Mar. 4, 2019.

(51) Int. Cl.
*G06Q 20/38* (2012.01)
*H04L 9/06* (2006.01)
*H04L 9/32* (2006.01)

(52) U.S. Cl.
CPC ..... *G06Q 20/3829* (2013.01); *G06Q 20/3825* (2013.01); *G06Q 20/3827* (2013.01);
(Continued)

(58) Field of Classification Search
CPC .... G06Q 20/38–3829; G06Q 20/38215; H04L 9/06–0643; H04L 9/32–3249
See application file for complete search history.

(56) References Cited

U.S. PATENT DOCUMENTS

2007/0022293 A1* 1/2007 Hayashi ............. H04L 9/3242
713/176
2008/0101610 A1* 5/2008 Birk ..................... H04L 9/0891
380/277
(Continued)

FOREIGN PATENT DOCUMENTS

CN 106651331 A 5/2017
CN 108063758 A * 5/2018
(Continued)

OTHER PUBLICATIONS

International Search Report of PCT Application No. PCT/CN2019/076884, dated Jun. 20, 2019, issued by the ISA/CN—National Intellectual Property Administration, PRC, China.
(Continued)

*Primary Examiner* — Jacob C. Coppola
(74) *Attorney, Agent, or Firm* — Finnegan, Henderson, Farabow, Garrett & Dunner, LLP

(57) ABSTRACT

Disclosed herein are methods, devices, and apparatuses, including computer programs stored on computer-readable media, for testing signature verification for a blockchain system. One of the methods includes: obtaining a testing configuration from a configuration file, wherein the testing configuration specifies a cryptography algorithm used in the blockchain system, a group of one or more private keys corresponding to the cryptography algorithm, and a predetermined execution result based on the cryptography algorithm and the group of one or more private keys; signing a transaction, by encrypting data representing the transaction based on the cryptography algorithm and the group of one or more private keys, to generate one or more signed transactions; sending the one or more signed transactions to the blockchain system and receiving an execution result from the blockchain system; and determining whether the prede-
(Continued)

termined execution result is satisfied based on the execution result.

17 Claims, 7 Drawing Sheets

(52) U.S. Cl.
CPC .......... *H04L 9/0643* (2013.01); *H04L 9/3249* (2013.01); *G06Q 2220/00* (2013.01); *H04L 9/0637* (2013.01)

(56) References Cited

U.S. PATENT DOCUMENTS

| | | | | |
|---|---|---|---|---|
| 2014/0075415 | A1* | 3/2014 | Goldish | G06F 11/3684 717/124 |
| 2016/0080156 | A1* | 3/2016 | Kaliski, Jr. | H04L 9/3247 713/176 |
| 2016/0301531 | A1* | 10/2016 | Finlow-Bates | H04L 9/3239 |
| 2016/0330034 | A1* | 11/2016 | Back | H04L 9/3255 |
| 2017/0180134 | A1* | 6/2017 | King | H04L 63/0853 |
| 2018/0167394 | A1* | 6/2018 | High | H04L 63/123 |
| 2019/0052470 | A1* | 2/2019 | Park | H04L 9/3073 |
| 2019/0097813 | A1* | 3/2019 | King | H04L 63/0823 |
| 2019/0295049 | A1* | 9/2019 | Karame | H04L 9/30 |
| 2019/0295050 | A1* | 9/2019 | Chalkias | G06Q 20/3827 |

FOREIGN PATENT DOCUMENTS

| | | | | |
|---|---|---|---|---|
| CN | 108063758 A | | 5/2018 | |
| CN | 108876369 A | * | 11/2018 | |
| CN | 108876369 A | | 11/2018 | |
| EP | 3644558 A1 | * | 4/2020 | ............. H04L 43/50 |
| WO | WO-2005043807 A1 | * | 5/2005 | ........... H04L 9/0861 |

OTHER PUBLICATIONS

Written Opinion of the International Searching Authority of PCT Application No. PCT/CN2019/076884, dated Jun. 20, 2019, issued by the ISA/CN—National Intellectual Property Administration, PRC, China.
Extended Search Report for European Application No. 19725907.0 from the European Patent Office, dated Mar. 4, 2020.
Written Opinion of Application No. 11201908552R, from the Intellectual Property Office of Singapore, dated May 11, 2020.
Written Opinion of Application 11201908552R, from the Intellectual Property Office of Singapore, dated May 7, 2021.

* cited by examiner

METHODS AND DEVICES FOR TESTING SIGNATURE VERIFICATION FOR BLOCKCHAIN SYSTEM

CROSS REFERENCE TO RELATED APPLICATIONS

This application is a continuation of International Application No. PCT/CN2019/076884, filed Mar. 4, 2019, the entire content of which is incorporated herein by reference.

TECHNICAL FIELD

The specification relates generally to computer technologies and, more particularly, to methods and devices for testing signature verification for a blockchain system.

BACKGROUND

Blockchain systems, also known as distributed ledger systems (DLSs) or consensus systems, may enable participating entities to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system maintains one or more blockchains. A blockchain is a data structure for storing data, such as transactions, that may prevent tampering and manipulation of the data by malicious parties.

Data in a block of a blockchain may represent a transaction. The data representing the transaction is generally encrypted for authentication purpose, such that the blockchain system can verify validity of the transaction. Different cryptography algorithms or different private keys of the same cryptography algorithm may be used for the encryption of the transaction, Therefore, methods and devices for testing the cryptography algorithms and corresponding private keys for the encryption of the transaction may be needed.

SUMMARY

In one embodiment, a computer-implemented method for testing signature verification for a blockchain system includes: obtaining a testing configuration from a configuration file, wherein the testing configuration specifies a cryptography algorithm used in the blockchain system, a group of one or more private keys corresponding to the cryptography algorithm, and a predetermined execution result based on the cryptography algorithm and the group of one or more private keys; signing a transaction, by encrypting data representing the transaction based on the cryptography algorithm and the group of one or more private keys, to generate one or more signed transactions; sending the one or more signed transactions to the blockchain system and receiving an execution result from the blockchain system, the execution result indicating whether the one or more signed transactions correspond to a valid transaction or an invalid transaction; and determining whether the predetermined execution result is satisfied based on the execution result received from the blockchain system.

In another embodiment, a device for testing signature verification for a blockchain system includes: one or more processors; and one or more computer-readable memories coupled to the one or more processors and having instructions stored thereon, wherein the instructions are executable by the one or more processors to: obtain a testing configuration from a configuration file; wherein the testing configuration specifies a cryptography algorithm used in the blockchain system, a group of one or more private keys corresponding to the cryptography algorithm, and a predetermined execution result based on the cryptography algorithm and the group of one or more private keys; sign a transaction; by encrypting data representing the transaction based on the cryptography algorithm and the group of one or more private keys, to generate one or more signed transactions; send the one or more signed transactions to the blockchain system and receive an execution result from the blockchain system, the execution result indicating whether the one or more signed transactions correspond to a valid transaction or an invalid transaction; and determine whether the predetermined execution result is satisfied based on the execution result received from the blockchain system.

In yet another embodiment, a non-transitory computer-readable medium has stored therein instructions that, when executed by a processor of a device, cause the device to perform a method for testing signature verification for a blockchain system. The method includes: obtaining a testing configuration from a configuration file, wherein the testing configuration specifies a cryptography algorithm used in the blockchain system, a group of one or more private keys corresponding to the cryptography algorithm, and a predetermined execution result based on the cryptography algorithm and the group of one or more private keys; signing a transaction, by encrypting data representing the transaction based on the cryptography algorithm and the group of one or more private keys, to generate one or more signed transactions; sending the one or more signed transactions to the blockchain system and receiving an execution result from the blockchain system, the execution result indicating whether the one or more signed transactions correspond to a valid transaction or an invalid transaction; and determining whether the predetermined execution result is satisfied based on the execution result received from the blockchain system.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
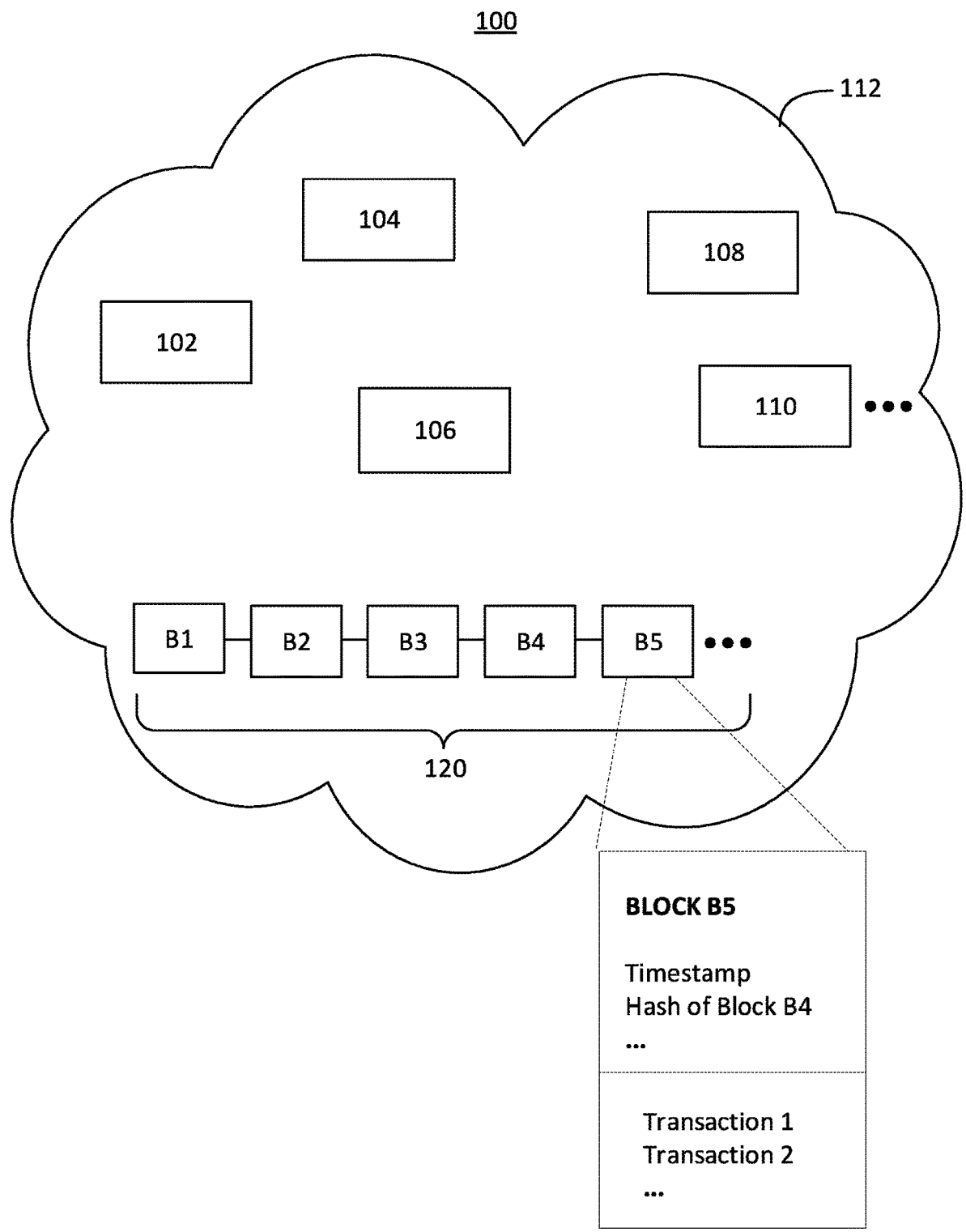
FIG. 1 illustrates a schematic diagram of a blockchain system, according to an embodiment.

Embodiments of the specification provide methods and devices for testing signature verification for a blockchain system. The methods and devices may obtain a testing configuration from a configuration file. The testing configuration may specify a cryptography algorithm used in the blockchain system, a group of one or more private keys corresponding to the cryptography algorithm, and a predetermined execution result based on the cryptography algorithm and the group of one or more private keys. The methods and devices may also sign a transaction by encrypting data representing the transaction based on the cryptography algorithm and the group of one or more private keys to generate one or more signed transactions. The methods and devices may further send the one or more signed transactions to the blockchain system and receive an execution result from the blockchain system. The execution result may indicate whether the one or more signed transactions correspond to a valid transaction or an invalid transaction. The methods and devices may further determine whether the predetermined execution result is satisfied based on the execution result received from the blockchain system.

Embodiments disclosed in the specification have one or more technical effects. In some embodiments, the methods and devices obtain a testing configuration from a configuration file and set a group of one or more private keys for each testing configuration in the configuration file. This allows automatic generation of testing configurations to verify signed transactions in a blockchain system under a variety of scenarios. Moreover, when it is needed to test the signature verification based on a new combination of private keys, this allows an easy update of the configuration file by simply adding the new combination. In other embodiments, the methods and devices encrypt the transaction based on the cryptography algorithm and one or more private keys to generate one or more signed transactions. This allows multiple combinations of private keys to be tested. In yet other embodiments, the methods and devices include a representation of each private key in the configuration file, rather than the private key itself, for example, by mapping the representation of a private key to the private key itself based on a correspondence. This saves a file size of the configuration file, thereby facilitating the generation and viewing of the configuration file by a user. In still other embodiments, the methods and devices perform the testing in parallel for multiple cryptography algorithms and multiple groups of private keys. This allows multiple cryptography algorithms and multiple private keys to be tested at substantially the same time.

The following description provides details of embodiments. In the embodiments, a blockchain is a data structure that stores data, e.g., transactions, in a way that the transactions may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be validated and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes within the public blockchain network, and is stored in a global blockchain. A global blockchain is a blockchain that is replicated across nodes (e.g., full blockchain nodes), and the nodes are in consensus with respect to the global blockchain, To achieve consensus (e.g., agreement to the addition of a block to a blockchain), a consensus protocol is implemented in the public blockchain network. Examples of consensus protocols include proof-of-work (POW) (e.g., implemented in the some crypto-currency networks), proof-of-stake (POS), and proof-of-authority (POA).

In general, a private blockchain network is provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be validated and added to the blockchain. In some examples, at least a sub-set of entities (nodes) (e.g., at least 7 entities) must sign every block in order for the block to be validated and added to the blockchain.

FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

In some embodiments, the blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in in FIG. 1, block B5 may include a timestamp, a cryptographic hash of block B4, and transaction data of block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

In some embodiments, the nodes 102-110 are configured to perform an operation on the blockchain 120. For example, when a node, e.g., the node 102, wants to store new data onto the blockchain 120, that node generates a new block to be added to the blockchain 120 and broadcasts the new block to other nodes, e.g., the nodes 104-110, in the network 112. Based on the validity of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

In some embodiments, transactions are authenticated in the blockchain system 100 based on a cryptography algorithm. The cryptography algorithm may provide a pair of keys including a private key and a public key. The private key is associated with a particular user and may encrypt data representing a transaction, e.g., initiated by the user. The encryption of the data representing the transaction may also be referred to as signing the transaction. The public key is provided to another user in the blockchain system 100 to decrypt the encrypted data, to verify whether the transaction is indeed authorized by that particular user. The decryption may also be referred to as signature verification. In one embodiment, the blockchain system 100 may support a plurality of cryptography algorithms, such as an RSA (Rivest-Shamir-Adleman) algorithm, an Elliptic Curve Digital Signature Algorithm (ECDSA), an SM2 algorithm, and the like.

In some embodiments, multi-signature may be performed on a transaction in the blockchain system 100. The multi-signature is a technique which allows a group of users and, thus, a group of private keys, to sign the same transaction.

Figure 2:
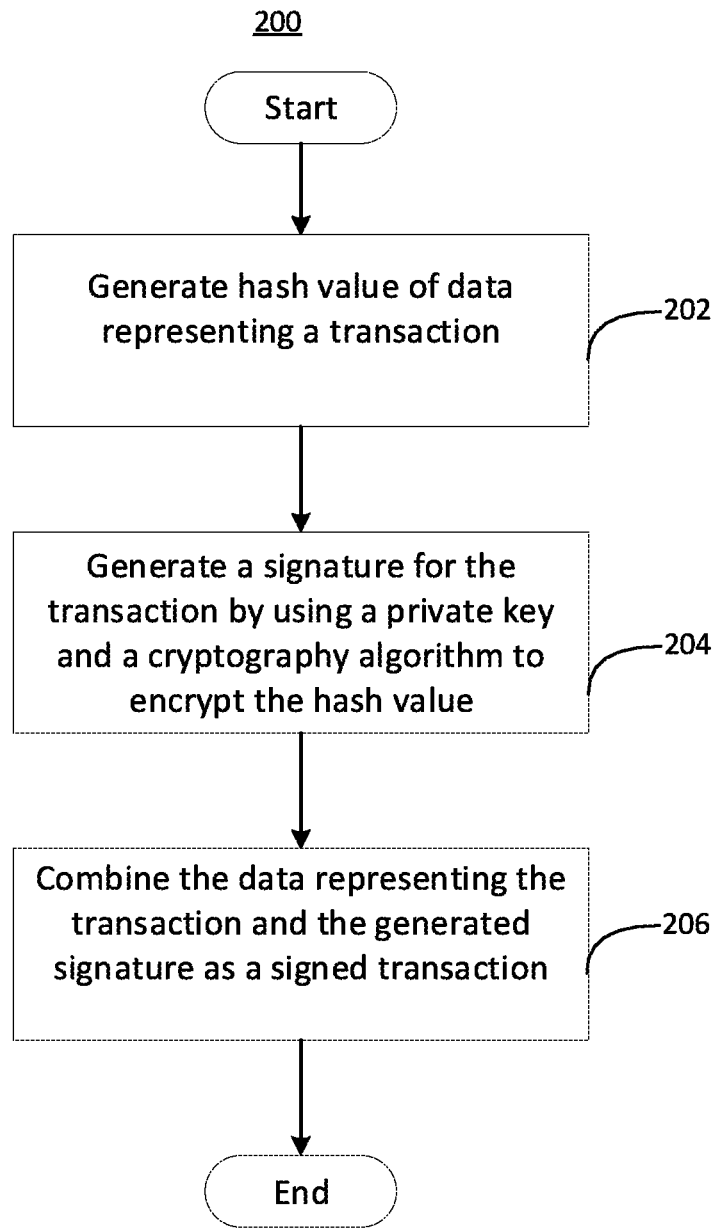
FIG. 2 is a flow chart of a signing method, according to an embodiment.

FIG. 2 is a flow chart of a signing method 200 for use in a blockchain system, such as the blockchain system 100 (FIG. 1), according to an embodiment. Referring to FIG. 2, in step 202, a hash value of data representing a transaction is generated by applying a hash algorithm on the data. In some embodiments, the hash value may also be referred to as a hash abstract. In step 204, a signature for the transaction is further generated by using a private key of a first user, e.g., the user initiating the transaction, and a cryptography algorithm to encrypt the hash value. In step 206, the data representing the transaction and the generated signature are combined as a signed transaction.

Figure 3:
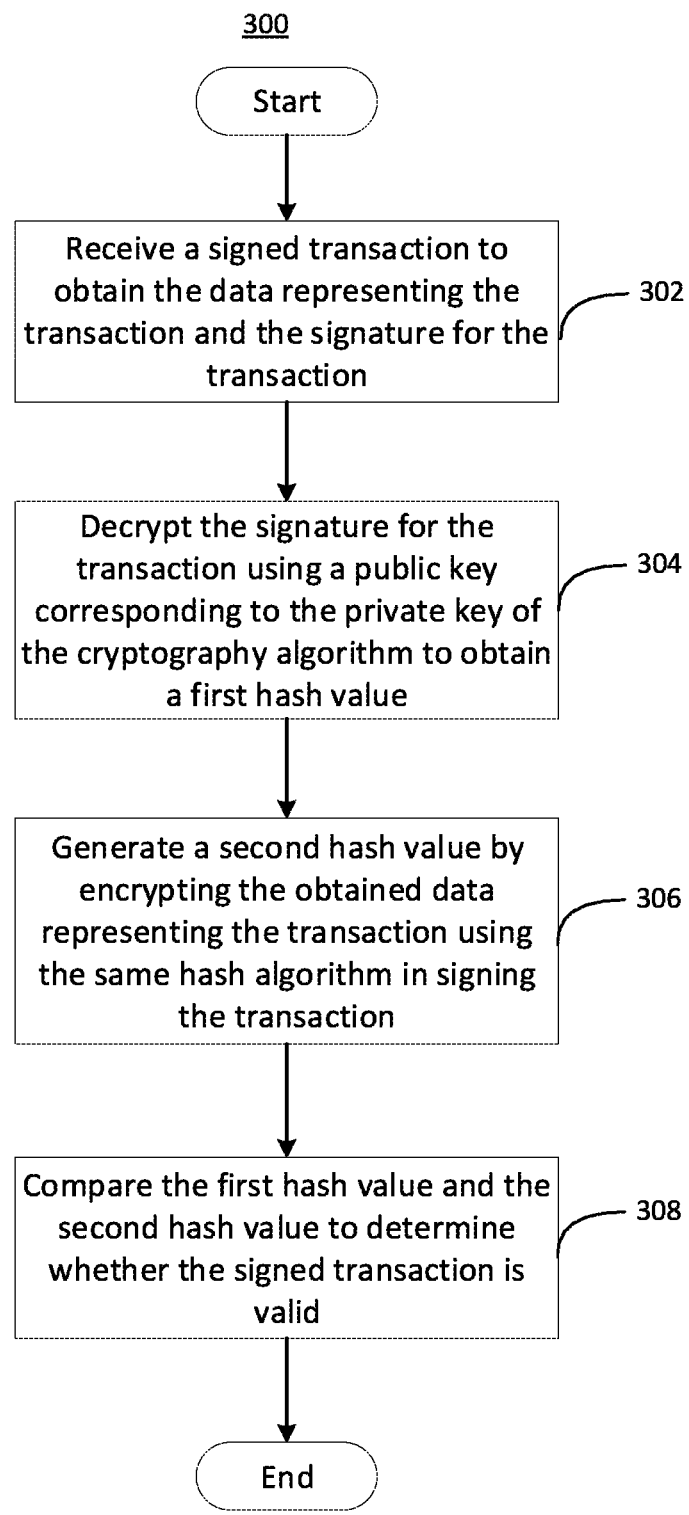
FIG. 3 is a flow chart of a signature verifying method, according to an embodiment.

FIG. 3 is a flow chart of a signature verifying method 300 for use in a blockchain system, such as the blockchain system 100 (FIG. 1), according to an embodiment. Referring to FIG. 3, in step 302, the signed transaction is received by a second user and processed to obtain the data representing the transaction and the signature for the transaction. In step 304, the signature for the transaction is decrypted using a public key corresponding to the private key of the cryptography algorithm, to obtain a first hash value. In step 306, a second hash value is generated by encrypting the obtained data representing the transaction using the same hash algorithm in signing the transaction. In step 308, the first hash value and the second hash value are compared to determine whether the signature and, thus, the signed transaction is valid. For example, if the first value matches the second value, it indicates that the private key used for encryption and the public used for decryption are a pair and, therefore, the signature for the transaction is valid. Thus, the transaction may be verified to be a valid transaction.

In some embodiments, a blockchain system may verify a transaction being signed by one or more users relating to the transaction. For example, each of the users may be associated with one or more private keys. Accordingly, a plurality of signatures for the transaction and, thus, a plurality of signed transactions may be generated. In some embodiments, the plurality of signatures may correspond to different weights, respectively. The blockchain system may verify the transaction based on validity of each of the signatures and the corresponding weight. In one embodiment, "one" represents the blockchain system determining a signature (and, thus, a signed transaction) to be valid, and "zero" represents the blockchain system determining a signature to be invalid. The blockchain system may verify the transaction based on a weighted sum of the validity of each of the signatures. For example, if the weighted sum is greater than a predetermined threshold, e.g., 70%, the blockchain system verifies the transaction as a valid transaction.

In some embodiments, the blockchain system may support one or more cryptography algorithms for signature verification. The signature verification by the blockchain system may be tested using the methods and devices described below.

Figure 4:
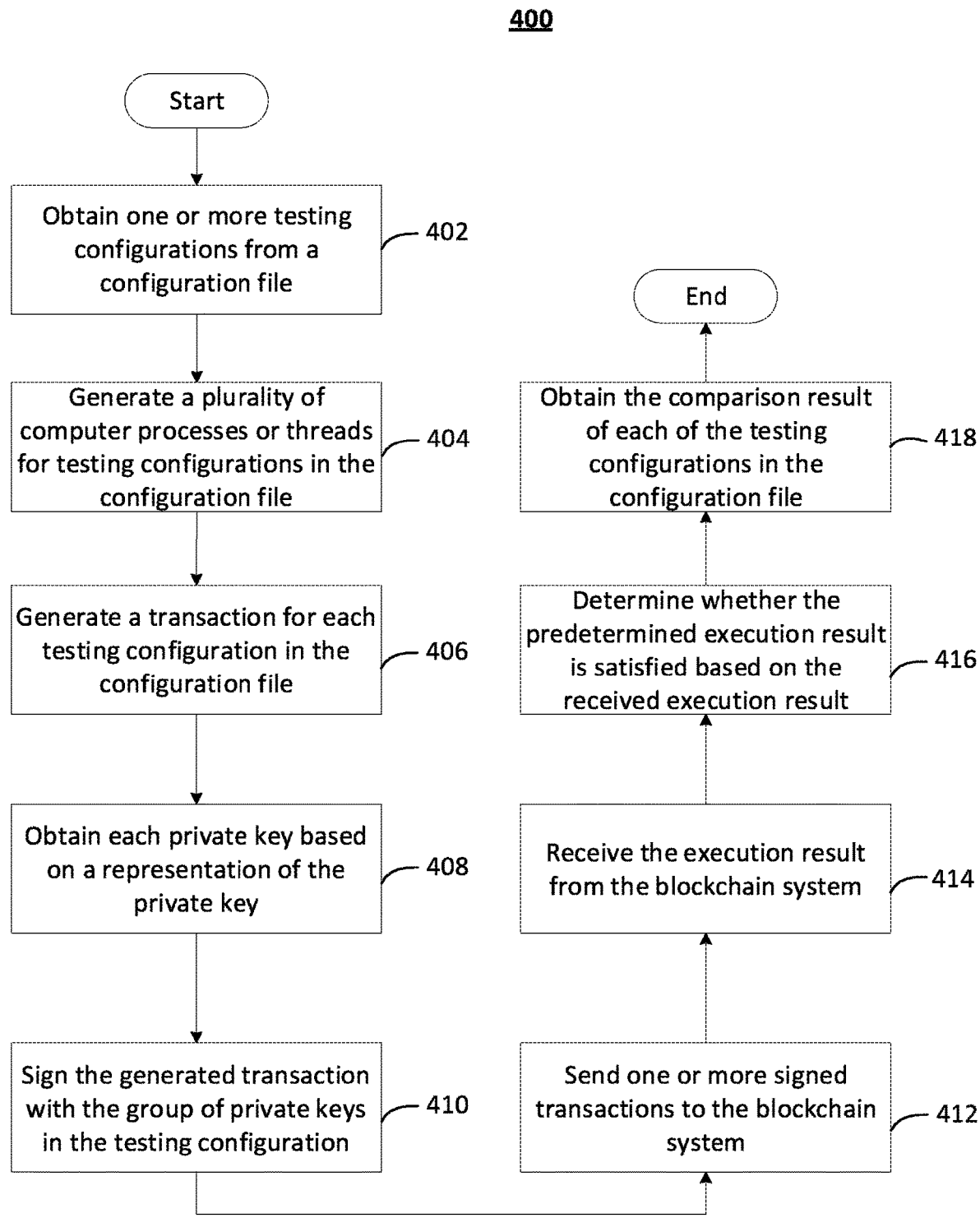
FIG. 4 is a flow chart of a method for testing signature verification for a blockchain system, according to an embodiment.

FIG. 4 is a flow chart of a method 400 for testing signature verification for a blockchain system, such as the blockchain system 100 (FIG. 1), according to one embodiment. For example, the method 400 may be performed by a computer system. Referring to FIG. 4, the method 400 may include the following steps.

In step 402, one or more testing configurations are obtained from a configuration file. For example, the configuration file may be generated by a user or automatically generated by the computer system, and the configuration file may be loaded into the computer system. Also, for example, each testing configuration in the configuration file may specify a cryptography algorithm used in the blockchain system for which signature verification is tested, a group of one or more private keys corresponding to the cryptography algorithm, and a predetermined execution result based on the cryptography algorithm and the group of one or more private keys. In some embodiments, each testing configuration may also be referred to as a use case or a testing case.

In some embodiments, each of the private keys in a testing configuration may be a valid private key or an invalid private key. For example, the testing configuration may contain duplicative private keys, one being valid and the other being invalid, to test a situation where the same private key is used to sign a transaction twice. By setting the private keys for each testing configuration in the configuration file, the method 400 can automatically test signature verification under different combinations of private keys used in actual situations.

In some embodiments, a representation of each of one or more private keys may be included in the configuration file. For example, a private key is generally a series of digits, such as 256 digits for the SM2 algorithm. To save a file size of the configuration file and facilitate generating and viewing the configuration file by a user, the configuration file may include a representation of the private key, rather than the 256-digit private key itself. For example, the representation of the private key may include an address where the private key is stored. Also, for example, the representation of the private key may include an alias, e.g., "prikey1," of the private key, so that the corresponding private key may be identified and retrieved.

In some embodiments, the predetermined execution result of a testing configuration may indicate an anticipated result when the corresponding cryptography algorithm and group of private keys in the testing configuration are used to sign a transaction. For example, if it is not allowed that the same private key signs a transaction twice in the blockchain system, the predetermined execution result of the testing configuration that specifies duplicative private keys may be set to "Invalid."

In one embodiment, the configuration file may be in the form of a table, such as Table 1 below,

TABLE 1

|  | Cryptography Algorithm | Private Keys | Predetermined Execution Result |
|---|---|---|---|
| Testing Configuration 1 | ECDSA | prikey1 prikey2 prikey3 | Valid |
| Testing Configuration 2 | SM2 | prikey1 prikey2 prikey2 | Invalid |
| Testing Configuration 3 | SM2 | prikey1 prikey2 prikey4 | Valid |
| . . . | . . . | . . . | . . . |

In one embodiment, testing configuration 1 is set for testing signature verification that requires a transaction signed by the ECDSA algorithm with private keys prikey1, prikey2, and prikey3; testing configuration 2 is set for testing signature verification that does not allow a transaction being signed by the SM2 algorithm with duplicative private keys prikey2 and prikey2; testing configuration 3 is set for testing signature verification that requires a transaction signed by the SM2 algorithm with private keys prikey1, prikey2, and prikey4.

In some embodiments, a threshold may be predetermined for signature verification for a transaction that needs to be signed by multiple users. For example, the threshold may be set to 70% for signature verification of the transaction to be valid. Accordingly, the predetermined execution result of the testing configuration may be set to "valid" if, e.g., a weighted sum of validity for each signature generated based on the testing configuration is supposed to be greater than 70%.

In some embodiments, the testing of signature verification may be performed based on the testing configurations in the configuration file in parallel or sequentially. For example, a plurality of computer processes or threads may be generated in step 404 for the testing configurations in the configuration file, and may be executed in parallel to improve efficiency of the testing.

In step 406, a transaction is generated for each testing configuration in the configuration file. In some embodiments, different types of transactions may be generated for performing the testing based on a testing configuration. For example, a transaction for registering an account and a transaction for transferring cryptocurrencies may be generated. By generating the different types of transactions, the cryptography algorithm and private keys in the testing configuration may be tested in a variety of scenarios.

In step 408, if the testing configuration includes a representation of a private key, the private key may be acquired based on the representation. For example, if the testing configuration includes an address where the private key is stored, the private key may be retrieved from the address. Also, for example, the testing configuration includes an alias (e.g., "prikey1") of the private key, the private key may be acquired, e.g., by checking a look-up table including a correspondence between the alias and the private key.

In step 410, the generated transaction is signed with the group of private keys in the testing configuration. For example, a hash value of the generated transaction may be generated according to a predetermined hash algorithm. The hash value of the generated transaction may further be used to generate one or more signed transactions, by encrypting the hash value of the generated transaction with the one or more private keys in the group, e.g., using the method 200 (FIG. 2).

In step 412, the one or more signed transactions are sent to the blockchain system for which testing signature verification is performed. The blockchain system may receive the one or more signed transactions for verification, e.g., using the method 300 (FIG. 3), and return an execution result corresponding to the testing configuration. The execution result may indicate whether the transaction is valid or invalid.

In step 414, the execution result is received from the blockchain system for which testing signature verification is performed.

In step 416, it is determined whether the predetermined execution result in the testing configuration is satisfied based on the execution result received from the blockchain system. For example, the received execution result is compared with the predetermined execution result in the corresponding configuration, to determine whether the received execution result matches the predetermined execution result. A comparison result may be generated for the testing configuration. For example, when the received execution result indicates that the transaction is valid and the predetermined execution result in the testing configuration is also valid, the comparison result may indicate that the blockchain system operates properly on signature verification for that testing configuration. In another example, when the received execution result indicates that the transaction is invalid but the predetermined execution result in the testing configuration is valid, the comparison result may indicate that the blockchain system does not operate properly on signature verification for that testing configuration.

In step 418, the comparison result of each of the testing configurations in the configuration file is obtained. For example, if the received execution result for each of the testing configurations matches the corresponding predetermined execution result, it may be determined that the blockchain system operates properly on signature verification.

Figure 5:
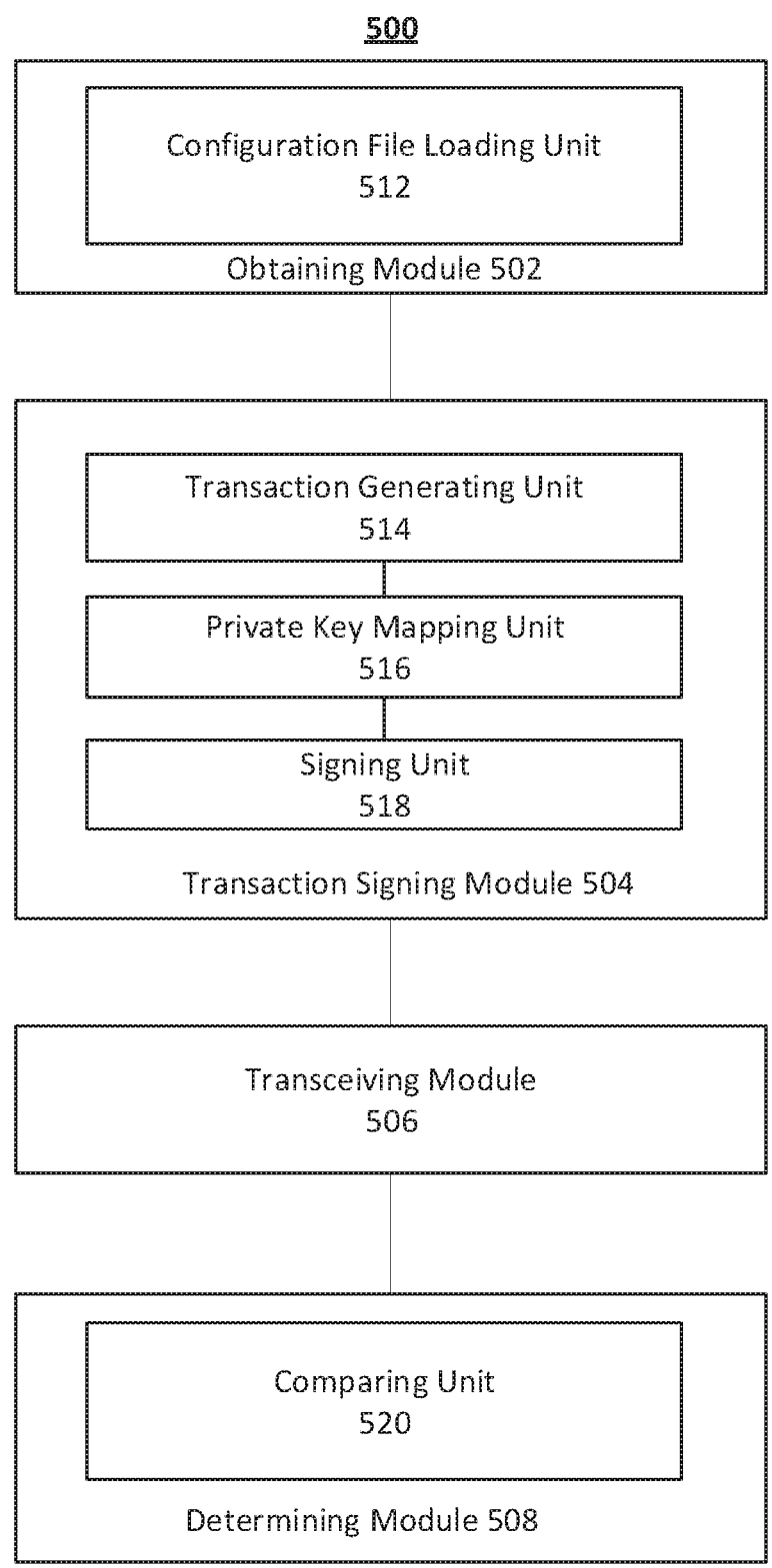
FIG. 5 is a block diagram of a device for testing signature verification for a blockchain system, according to an embodiment.

FIG. 5 illustrates a block diagram of a device 500 for testing signature verification for a blockchain system, according to an embodiment. For example, the device 500 may perform the method 400 (FIG. 4). Referring to FIG. 5, the device 500 may include an obtaining module 502, a transaction signing module 504, a transceiving module 506, and a determining module 508.

The obtaining module 502 may obtain one or more testing configurations from a configuration file. For example, the obtaining module 502 may include a configuration file loading unit 512 to load the configuration file into the device 500. Also, for example, each testing configuration in the configuration file may specify a cryptography algorithm used in the blockchain system for which signature verification is tested, a group of one or more private keys corresponding to the cryptography algorithm, and a predetermined execution result based on the cryptography algorithm and group of one or more private keys. Each testing configuration may also be referred to as a use case or a testing case.

In some embodiments, each of the private keys specified in a testing configuration may be a valid private key or an invalid private key. For example, the testing configuration may contain duplicative private keys, one being valid and the other being invalid, to test a situation where the same private key is used to sign a transaction twice. By setting the private keys for each testing configuration in the configuration file, the device 500 can automatically test signature verification under different combinations of private keys that may be used in actual situations.

In some embodiments, the predetermined execution result of a testing configuration may indicate an anticipated result when the corresponding cryptography algorithm and the group of private keys in the testing configuration are used to sign a transaction. For example, if it is not allowed that the same private key signs a transaction twice, the predetermined execution result of the testing configuration that specifies duplicative private keys may be set to "Invalid."

The transaction signing module 504 may sign a transaction by encrypting data representing the transaction based on the cryptography algorithm and the group of one or more private keys in each testing configuration, to generate one or more signed transactions. The transaction signing module 504 may include a transaction generating unit 514, a private key mapping unit 516, and a signing unit 518.

The transaction generating unit 514 may generate a transaction for each testing configuration in the configuration file. If the testing configuration includes a representation of a private key, e.g., an alias of the private key, the private key mapping unit 516 may map the representation of the private key to the private key itself by checking a look-up table including a correspondence between the alias and the private key. The signing unit 518 may sign the generated transaction with the group of private keys in the testing configuration, to generate one or more signed transactions.

The transceiving module 506 may send the one or more signed transactions to the blockchain system for which testing signature verification is performed. The blockchain system may receive and verify the one or more signed transactions using the method 300 (FIG. 3). The transceiving module 506 may further receive an execution result from the blockchain system, the execution result indicating whether the transaction is valid or invalid.

The determining module 508 may determine whether the predetermined execution result is satisfied based on the execution result received from the blockchain system. For example, the determining module 508 may include a comparing unit 520 to compare the received execution result with the predetermined execution result in the testing configuration, to determine whether the received execution result matches the predetermined execution result.

The device 500 may generate a determining result for each testing configuration in the configuration. In one embodiment, if the received execution result for each testing configuration matches the corresponding predetermined execution result, the device 500 may determine that signature verification of the blockchain system passes the testing.

In some embodiments, each of the above described modules and units may be implemented as software, or hardware, or a combination of software and hardware. For example, each of the above described modules and units may be implemented using a processor executing instructions stored in a memory. Also, for example, each of the above described modules and units may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the below described method.

Figure 6:
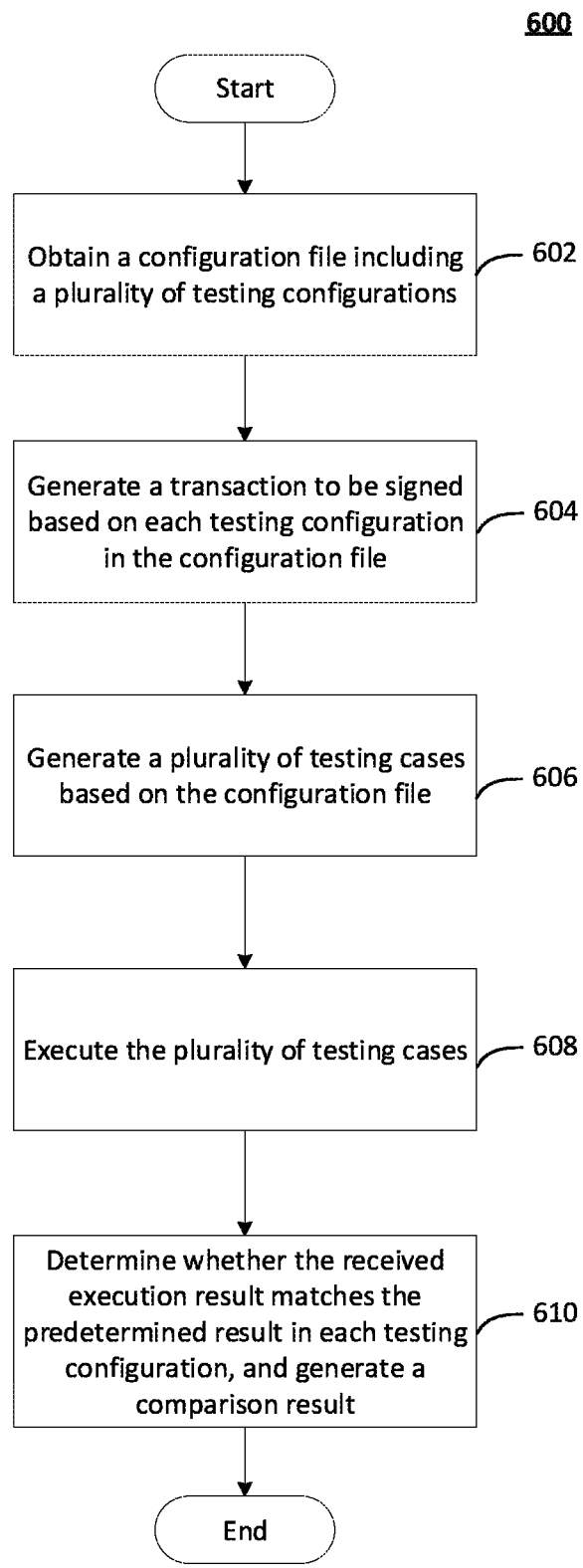
FIG. 6 is a flow chart of a method for testing signature verification for a blockchain system, according to an embodiment.

FIG. 6 is a flow chart of a method 600 for testing signature verification for a blockchain system, according to another embodiment. The method 600 may be performed by a computer system. The computer system may include a memory storing a set of instructions and at least one processor configured to execute the set of instructions to cause the computer system to perform the method 600. Referring to FIG. 6, the method 600 may include the following steps.

In step 602, the computer system may obtain a configuration file including a plurality of testing configurations each specifying a group of one or more private keys, a corresponding cryptography algorithm, and a predetermined execution result based on the cryptography algorithm and the group of one or more private keys. The cryptography algorithm may be the RSA algorithm, the ECDSA algorithm, or the SM2 algorithm.

In step 604, the computer system may generate a transaction to be signed based on each testing configuration in the configuration file.

In step 606, the computer system may generate a plurality of testing cases based on the configuration file. Each of the plurality of testing cases corresponds to one of the testing configurations in the configuration file. For example, each of the testing cases corresponds to a group of one or more private keys, a corresponding cryptography algorithm, and a predetermined execution result based on the cryptography algorithm and group of one or more private keys.

In step 608, the computer system may execute the plurality of testing cases by signing the transaction using the group of one or more private keys and the corresponding cryptography algorithm and sending one or more signed transactions to the blockchain system. In some embodiments, the computer system may generate a hash value of the transaction, obtain one or more private keys according to a testing configuration, and sign the transaction by encrypting the hash value with each of the obtained private keys.

The computer system may receive an execution result from the blockchain system, and compare the execution result with the predetermined execution result. The execution result may indicate the transaction being valid or invalid.

In step 610, the computer system may determine whether the received execution result matches the predetermined result in each testing configuration, and generate a comparison result. The computer system may further determine that signature verification operates properly in the blockchain system, if the received execution result matches the predetermined result in each testing configuration in the configuration file.

Figure 7:
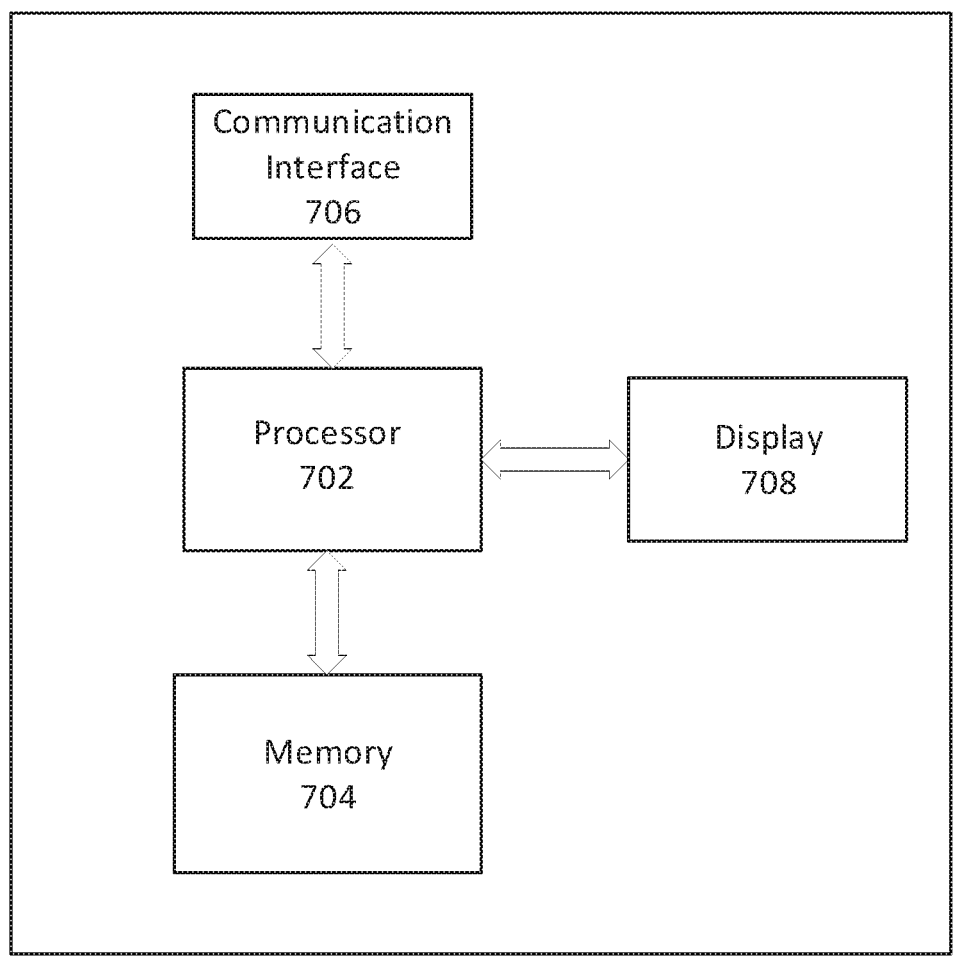
FIG. 7 is a block diagram of a device for testing signature verification for a blockchain system, according to an embodiment.

FIG. 7 is a block diagram of a device 700 for testing signature verification for a blockchain system, according to one embodiment. For example, the device 700 may be implemented using a computer system. Referring to FIG. 7, the device 700 may include a processor 702, a memory 704, a communication interface 706, and a display 708.

In some embodiments, the processor 702 may execute instructions to perform the above described methods. The processor 702 may include one or more modules which facilitate the testing. For example, the processor 702 may include the obtaining module 502, the transaction signing module 504, the transceiving module 506, and the determining module 508 (FIG. 5).

In some embodiments, the memory 704 may store instructions for performing the above described methods. The memory 704 may be implemented as any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

In some embodiments, the communication interface 706 may facilitate communication between the device 700 and other devices. The communication interface 706 may support one or more communication standards, such as an Internet standard or protocol, an Integrated Services Digital Network (ISDN) standard, etc.

In some embodiments, the display 708 may display a testing result when the above described methods are performed. For example, the display 708 may be a liquid crystal display (LCD). Also, for example, the display 708 may include a touch screen to receive user input.

In some embodiments, there is also provided a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special-purpose hardware-based systems that perform the specified functions or acts, or combinations of special-purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless noted as such.

Although the specification has been described in conjunction with specific embodiments thereof, it is evident that many alternatives, modifications and variations will be apparent to those skilled in the art. Accordingly, the following claims embrace all such alternatives, modifications and variations that fall within the terms of the appended claims.

What is claimed is:

1. A computer-implemented method for testing signature verification for a blockchain system, comprising:
   obtaining a testing configuration from a configuration file, wherein the testing configuration specifies a cryptographic algorithm used in the blockchain system, a group of private keys corresponding to the cryptographic algorithm, and a predetermined execution result based on the cryptographic algorithm and the group of private keys, wherein the group of private keys specified by the testing configuration includes duplicative private keys, a first one of the duplicative private keys being valid, and a second one of the duplicative private keys being invalid, and wherein the predetermined execution result of the testing configuration is set to be invalid;

signing a transaction, by encrypting data representing the transaction based on the cryptographic algorithm and the group of private keys, to generate signed transactions;

sending the signed transactions to the blockchain system and receiving an execution result from the blockchain system, the execution result indicating whether the signed transactions correspond to a valid transaction or an invalid transaction; and determining whether the predetermined execution result is satisfied based on the execution result received from the blockchain system.

2. The method of claim 1, wherein the cryptographic algorithm used in the blockchain system comprises at least one of an RSA algorithm, an ECDSA algorithm, or an SM2 algorithm.

3. The method of claim 1, wherein the testing configuration includes a representation of each of the group of private keys, the method further comprising:

mapping the representation of each of the group of private keys to a corresponding private key; and obtaining the corresponding private key.

4. The method of claim 1, further comprising:

generating the transaction; and determining a hash value for the generated transaction as the data representing the transaction.

5. The method of claim 1, wherein determining whether the predetermined execution result is satisfied comprises:

comparing the execution result received from the blockchain system with the predetermined execution result to make the determination.

6. The method of claim 1, further comprising:

receiving the execution result based on a weight corresponding to each private key in the group of private keys.

7. The method of claim 1, further comprising:

in response to a determination that the predetermined execution result is satisfied, displaying a testing result indicating that signature verification in the blockchain system operates properly.

8. The method of claim 1, further comprising:

obtaining a plurality of testing configurations from the configuration file, wherein the plurality of testing configurations specify a plurality of cryptographic algorithms used in the blockchain system, a plurality of groups of private keys, and a plurality of predetermined execution results; and performing the testing in parallel based on the plurality of testing configurations.

9. A device for testing signature verification for a blockchain system, comprising:

one or more processors; and one or more computer-readable memories coupled to the one or more processors and having instructions stored thereon that are executable by the one or more processors, wherein the one or more processors are configured to:

obtain a testing configuration from a configuration file, wherein the testing configuration specifies a cryptographic algorithm used in the blockchain system, a group of private keys corresponding to the cryptographic algorithm, and a predetermined execution result based on the cryptographic algorithm and the group of private keys, wherein the group of private keys specified by the testing configuration includes duplicative private keys, a first one of the duplicative private keys being valid, and a second one of the duplicative private keys being invalid, and wherein the predetermined execution result of the testing configuration is set to be invalid;

sign a transaction, by encrypting data representing the transaction based on the cryptographic algorithm and the group of private keys, to generate signed transactions;

send the signed transactions to the blockchain system and receive an execution result from the blockchain system, the execution result indicating whether the signed transactions correspond to a valid transaction or an invalid transaction; and determine whether the predetermined execution result is satisfied based on the execution result received from the blockchain system.

10. The device of claim 9, wherein the cryptographic algorithm used in the blockchain system comprises at least one of an RSA algorithm, an ECDSA algorithm, or an SM2 algorithm.

11. The device of claim 9, wherein the testing configuration includes a representation of each of the group of private keys, and the one or more processors are further configured to:

map the representation of each of the group of private keys to a corresponding private key; and obtain the corresponding private key.

12. The device of claim 9, wherein the one or more processors are further configured to:

generate the transaction; and determine a hash value for the generated transaction as the data representing the transaction.

13. The device of claim 9, wherein in determining whether the predetermined execution result is satisfied, the one or more processors are further configured to:

compare the execution result received from the blockchain system with the predetermined execution result to make the determination.

14. The device of claim 9, wherein the one or more processors are further configured to:

receive the execution result based on a weight corresponding to each private key in the group of private keys.

15. The device of claim 9, wherein the one or more processors are further configured to:

in response to a determination that the predetermined execution result is satisfied, display a testing result indicating that signature verification in the blockchain system operates properly.

16. The device of claim 9, wherein the one or more processors are further configured to:

obtain a plurality of testing configurations from the configuration file, wherein the plurality of testing configurations specify a plurality of cryptographic algorithms used in the blockchain system, a plurality of groups of private keys, and a plurality of predetermined execution results; and perform the testing in parallel based on the plurality of testing configurations.

17. A non-transitory computer-readable medium having stored therein instructions that, when executed by a processor of a device, cause the device to perform a method for testing signature verification for a blockchain system, the method comprising:

obtaining a testing configuration from a configuration file, wherein the testing configuration specifies a cryptographic algorithm used in the blockchain system, a group of private keys corresponding to the cryptographic algorithm, and a predetermined execution result based on the cryptographic algorithm and the group of private keys, wherein the group of private keys specified by the testing configuration includes duplicative private keys, a first one of the duplicative private keys being valid, and a second one of the duplicative private keys being invalid, and wherein the predetermined execution result of the testing configuration is set to be invalid;

signing a transaction, by encrypting data representing the transaction based on the cryptographic algorithm and the group of private keys, to generate signed transactions;

sending the signed transactions to the blockchain system and receiving an execution result from the blockchain system, the execution result indicating whether the signed transactions correspond to a valid transaction or an invalid transaction; and determining whether the predetermined execution result is satisfied based on the execution result received from the blockchain system.

* * * * *